Figure 1:
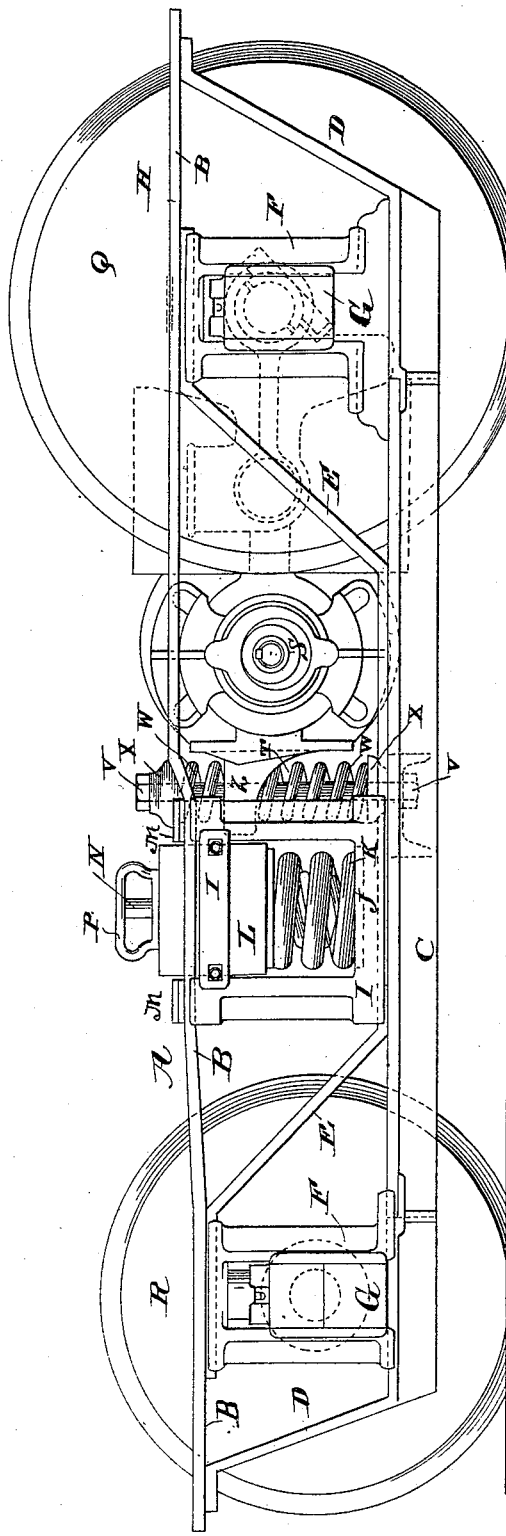

(No Model.) 2 Sheets—Sheet 1.

G. M. BRILL.
MOTOR TRUCK FOR CARS.

No. 461,662. Patented Oct. 20, 1891.

Attest:
C. W. Benjamin
J. W. Forcher

Inventor:
George Martin Brill.
By Joseph G. Levy
atty.

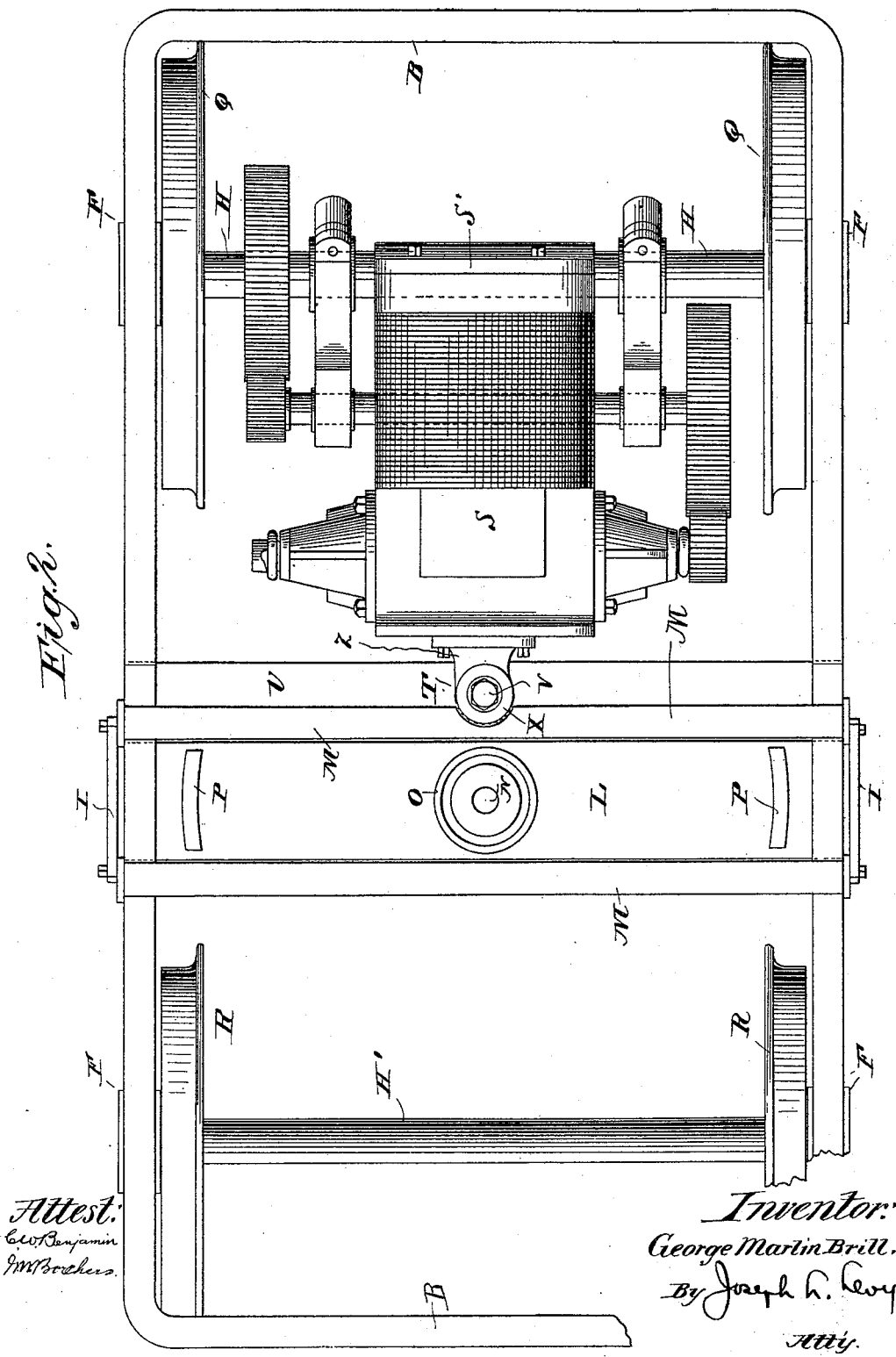

UNITED STATES PATENT OFFICE.

GEORGE MARTIN BRILL, OF PHILADELPHIA, PENNSYLVANIA.

MOTOR-TRUCK FOR CARS.

SPECIFICATION forming part of Letters Patent No. 461,662, dated October 20, 1891.

Application filed June 19, 1890. Serial No. 355,951. (No model.)

*To all whom it may concern:*

Be it known that I, GEORGE MARTIN BRILL, a citizen of the United States, residing at Philadelphia, in the county of Philadelphia and State of Pennsylvania, have invented new and useful Improvements in Car-Trucks for Electric Motors, of which the following is a specification.

My invention relates to improvements in car-trucks of electrically-propelled cars, and particularly to the arrangements of the parts thereof, the object being to provide a truck of simple, durable, and economical construction, on which the car will be spring-supported, and which truck itself will afford means for support of one or more electric motors on its driving-axle or driving end for the propulsion of the car, whereby any springing or vibratory motion of the car upon the truck will be independent of and without effect upon the motor.

It consists in locating the king-bolt and bolster off the center, or, in other words, to the rear, as in the present case, of a line drawn semi-distant between the centers of the truck-axles, and this is accomplished without endangering the relation of the truck-wheels to the rail when the car or vehicle is in motion or otherwise.

Another feature of my structure consists in using wheels for that end of the truck which directly supports the weight of the motor, &c., of a larger diameter than those which have simply their usual weight to support. This is done in order to raise that particular axle above the ground, whereby greater space will be obtained for the motor and other driving mechanism upon the frame of the truck. The axle of a small wheel being close to the ground does not admit of sufficient room being had to get in a motor and accompanying mechanism necessary for a much larger car. With the present arrangement a much larger motor can be used. It is further very advantageous to have a larger truck-wheel connected to the driving-gear of the motor, as a comparatively small pinion can be used on the motor and suitably geared to the axle of the larger wheel. The motor can then have great speed in comparison with the speed of the driving-wheel of the truck, whereby a more beneficial disposition of the motive power is obtained. Also motors and other propelling devices which have downwardly-projecting parts can be more readily accommodated by reason of this change.

In the extended use of electrically-propelled cars it is desired in many instances to mount the car-body on swivel-trucks and to apply the motor or motors for propelling the cars to the trucks themselves, so that they will be supported independently of the car-body, and in a position to exert their power more directly and effectually upon the wheels. It is usual in cars of this construction to connect the motor to one axle only of the truck, so that the power is exerted upon one pair of wheels of the truck, while the other pair act simply as trailing or supporting wheels to maintain the truck and the car-body resting thereon. With this construction it has been found in practice that the trailing wheels have a tendency to climb, and thereby are liable to cause a derailment of the car, and this is especially true in rounding curves and the like where the track varies materially from a straight line, also pounding of the truck-wheels takes place, which eventually ends in bending the axle.

The main object of my present invention is to overcome in the best manner possible this tendency to climb and pound on the part of the truck or trailing wheels and at the same time to so mount the motor and distribute the weight of the car upon the truck as to produce the most efficient action and provide a simple, cheap, and substantial structure.

With this object in view the invention consists in a pivotal truck for an electrically-propelled car, arranged and constructed as hereinafter pointed out.

The frame-work of the truck may be of any usual or preferred form, provided with the usual housings, in which are mounted the bearings or boxes of the axles. The electric motor is preferably supported between the axles of the truck, one end being sleeved upon one of the axles while the other end is spring-supported from the frame-work of the truck, and the armature of the motor is connected by suitable gears with a gear wheel or wheels mounted on the axle of the driving-wheels. These drive-wheels are made of larger diameter than the trailing or supporting wheels of the truck, and the axle-boxes are adjusted in the frame at different levels, so that the frame is preferably parallel to the track. A truck thus constructed, having a motor mounted in one end and connected to the larger drive-wheels is evidently out of proper balance, the greater portion of the weight being upon the driving-wheel. In order to overcome this objection, I arrange the king-bolt, by means of which the truck-frame is swiveled to the car-body, out of center of the truck and near the truck-wheels—that is to say, to the rear (the driving end being termed the "front") of a line drawn semi-distant between the truck-axles, and by properly adjusting this distance the weight of the car-body will be properly distributed on all of the wheels of the truck, and in this way all tendency to climbing and pounding on the part of the truck-wheels will be avoided. Not only is this true, but the truck being swiveled at the rear of its center, it will take a curve with greater ease and less friction than when, as has been usual in this class of trucks, it is centrally swiveled. In order to assist in equalizing the pressure on all portions of the truck, the king-bolt and its supporting-bolster are spring-supported in the frame-work of the truck, and in this way I overcome the objections arising from inequalities of the track and maintain an even distribution of the weight on all the wheels of the truck in all conditions. The large wheels which are used upon my truck are termed "driving-wheels," in order to distinguish them from a truck or carrying wheel. This construction, wherein this invention resides and by means of which I am enabled to obtain the objects above described, will be more fully set forth in the following description and the claims.

Reference is to be had to the accompanying drawings, forming part of the specification, in which similar letters have reference to corresponding parts in all the views.

Figure 1 is a side elevation of a four-wheel truck showing my improvement, the motor being shown in outline, and the detail of the connecting-gearing between the axle and motor being omitted for the purpose of clearness. Fig. 2 is a plan view of the truck, showing the motor in position and the location of the spring-cushions, bolster, and king-bolt.

In the drawings, A is the truck-frame, composed of the members B, C, D, and E. Supported within the truck frame and between its members are the axle-box saddles F, carrying axle-boxes G, in which are the axles H H'. At I is shown the transom. This transom supports springs K of the usual form, which are connected at their upper ends with a bolster L, said bolster being permitted to rise and fall freely, being held in position by the guides M stretched across the truck-frame and secured to the member B thereof. At N is shown the king-bolt located in the center-plate O, which center-plate and king-bolt are securely affixed to the bolster L in any manner. At P are shown the truck side bearings, which are fastened to the bolster L.

The foregoing description of the parts of the truck-frame and details is only used to show a well-organized and operative device, and such parts may be altered or changed to suit any particular requirements, the only essential feature of such construction being, as above stated, the location of the king-bolt N and its supporting devices off, or, in other words, to the front or to the rear of a line drawn semi-distant between the centers of the truck-axles.

The other part of my structure, which consists of increasing the diameter of what I term the "driving-wheels" of the truck, contemplates the use of such improvement in the front or driving end of the said truck—that is, when the car is moved always with this end first. In following out my plan I place upon the driving-axle H of the truck driving-wheels Q, and on the rear axle H', I place the truck-wheels R, the driving-wheels and truck-wheels being distinguished as above described.

In order that the motor may be spring-suspended in the truck, I pivotally secure the rear end S' of the motor S upon the driving-axle H, the other end of the motor being secured to what I term a "spring-cushion" T. The motor S, the gearing between the motor and the driving-axle, and the supports for such gearing being of the usual form no particular description of the same is necessary here.

The spring-cushion is constructed substantially as follows: A transverse plank U of sufficient strength is secured to the lower members of the truck-frame C, and to this is rigidly secured an upright rod V, having nuts at both ends. Around this rod are placed spiral or other springs W, having any desired structure or characteristics, being held in position by the spring-caps X. The front end of the motor S is provided with an extension Z, having a hole through which the upright rod V can freely pass. This extension is placed between the springs W, so that the ends thereof are in contact with it. It will thus be seen that I provide means whereby the shock upon the motor and any upward, downward, or oscillating movement of the same is compensated for and relieved by the spring-cushion T. The said motor being free to oscillate within the limits of its connection with the spring-cushion T upon the driving-axle H', the connecting-gearing and the axle are relieved from undue strain and are not liable to breakage or disarrangement.

It will thus be seen from the foregoing description that the benefits and advantages above described are obtained, and that the details of the whole device as to structure may be materially changed or altered without departing from the spirit of the invention.

I have used in the specification the phrases "pivotally supporting" and "sleeved" when speaking of the manner in which the motor is secured to one of the axles of the truck. These terms I have used interchangeably to mean the same thing. I have also used the phrases "a line drawn semi-distant between the centers of the truck-axles" and "the center of the truck," and these phrases I have used synonymously.

Having thus described my invention, what I claim, and desire to secure by Letters Patent, is—

1. In a swiveling truck for electrically-propelled cars, the combination, with the frame of the truck, of the driving-wheels larger in diameter than the truck-wheels and an electric motor, one end of which is spring-supported from the frame of the truck, and connections between the armature of the motor and the driving-wheels, substantially as described.

2. In a swiveling truck for electrically-propelled cars, the combination, with the frame of the truck, of the driving-wheels larger in diameter than the truck-wheels, a motor connected to the driving-wheels, and a king-bolt supported by the frame-work to the rear of a line drawn semi-distant from the truck-axles, substantially as described.

3. In a swiveling truck for electrically-propelled cars, the combination of the frame-work of the truck, the rear trailing wheels supported in boxes in the truck, forward driving-wheels also supported in boxes in the truck, the driving-wheels being of larger diameter than the trailing wheels, a motor connected to the driving-wheels, and a king-bolt mounted on the frame of the truck at the rear of a line drawn semi-distant from the truck-axles, substantially as described.

4. In a swiveling truck for electrically-propelled cars, the combination of the truck-frame, the enlarged driving-wheels, and the king-bolt located out of center and to the rear of the center of the truck, the king-bolt being spring-supported, substantially as described.

5. In a car-truck, the combination of a truck-frame A, having upper and lower members B and C, axle-boxes G in said frame, a pair of truck-wheels R, mounted on an axle set in axle-boxes at one end of the frame, a pair of driving-wheels Q larger in diameter than the truck-wheels mounted on an axle set in the axle-boxes at the opposite end of the frame, a spring-supported center or king bolt N, located forward of or to the rear of a line drawn semi-distant between the centers of the axles, the said king-bolt being located between said line and the center of the truck-wheel axle, substantially as described.

6. The combination, in a truck, said truck having a frame, wheels, axles, and axle-boxes in the frame, of a motor sleeved to an axle at one end of the frame, and a king-bolt located between the actual center of the truck and the center of the wheel opposite that upon which the motor is sleeved, substantially as described.

7. In an electrically-propelled car-truck, the combination of a truck-frame having driving-wheels, axle-boxes and an axle located at one end of the frame, truck-wheels smaller in diameter than the driving-wheels, axle-boxes and an axle located at the opposite end of the frame, a king-bolt located between the actual center of the truck and the center of the axle of the smaller wheels, and a motor sleeved at one end upon the axle of the driving-wheels, its free end being spring-supported from the truck-frame, the said motor and means for supporting the free end of the motor being located between the driving-axle and the king-bolt, substantially as described.

8. In an electrically-propelled car-truck, the combination of a truck-frame having upper and lower members rigidly secured together, driving-wheels, axle-boxes and an axle located at one end of said frame, truck-wheels smaller in diameter than the driving-wheels, with axle-boxes and an axle located at the other end of the frame, a spring-supported king-bolt located between the actual center of the truck and secured to said frame, and a motor secured to said frame between the axle of the driving-wheels and the king-bolt, substantially as described.

9. In an electrically-propelled car-truck, the combination of a truck-frame having upper and lower members rigidly secured together, wheels, axle-boxes and axles in the frame, a spring-supported king-bolt located between the actual center of the truck and the center of the axle of one of the wheels, a motor sleeved at one end upon the axle of one of the wheels, a transversely-disposed beam secured to the lower members of the truck-frame, an upwardly-disposed rod carrying springs for supporting the free end of the motor secured to said beam, said motor and the said means for spring-supporting its free end being located between the actual center of one of the wheels and the said king-bolt, substantially as described.

GEORGE MARTIN BRILL.

Witnesses:
 JOSEPH L. LEVY,
 SAML. ROBERTS.